United States Patent
Chen

(10) Patent No.: US 7,924,922 B2
(45) Date of Patent: Apr. 12, 2011

(54) COLOR REGISTRATION IN A DIGITAL VIDEO

(75) Inventor: Mei Chen, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1417 days.

(21) Appl. No.: 11/074,978

(22) Filed: Mar. 7, 2005

(65) Prior Publication Data

US 2006/0197855 A1    Sep. 7, 2006

(51) Int. Cl.
*H04N 7/12* (2006.01)
*H04N 11/02* (2006.01)
*H04N 11/04* (2006.01)
*H04N 9/093* (2006.01)

(52) U.S. Cl. .................... 375/240.16; 348/263

(58) Field of Classification Search ............... 375/240.16
See application file for complete search history.

(56) References Cited

U.S. PATENT DOCUMENTS

| | | | |
|---|---|---|---|
| 5,611,000 A * | 3/1997 | Szeliski et al. | 382/294 |
| 5,920,659 A | 7/1999 | Iverson et al. | |
| 5,963,675 A * | 10/1999 | van der Wal et al. | 382/260 |
| 6,031,581 A | 2/2000 | Harrington | |
| 6,462,788 B1 | 10/2002 | Tan et al. | |
| 6,473,462 B1 * | 10/2002 | Chevance et al. | 375/240.16 |
| 6,577,352 B1 | 6/2003 | Park et al. | |
| 6,611,289 B1 * | 8/2003 | Yu et al. | 348/265 |
| 6,741,757 B1 | 5/2004 | Torr et al. | |
| 7,092,584 B2 * | 8/2006 | Perlmutter et al. | 382/294 |
| 2002/0071613 A1 | 6/2002 | Ford et al. | |
| 2004/0130680 A1 * | 7/2004 | Zhou et al. | 352/38 |
| 2004/0264799 A1 | 12/2004 | Gallagher et al. | |
| 2005/0249434 A1 * | 11/2005 | Xu et al. | 382/294 |

* cited by examiner

*Primary Examiner* — Marsha D Banks Harold
*Assistant Examiner* — Jeremaiah C Huber

(57) ABSTRACT

A method performed by a processing system includes building a first image pyramid of a first frame of a first channel of a digital video, building a second image pyramid of a second frame of a second channel of the digital video, the second frame corresponding to the first frame, and determining a first global motion estimation for the first frame to the second frame based on the first image pyramid and the second image pyramid.

37 Claims, 6 Drawing Sheets

COLOR REGISTRATION IN A DIGITAL VIDEO

BACKGROUND

Movies, videos, and other images may be captured from one or more scenes using a video capture medium such as film or a photodetector array and a video capture device such as a camera or scanner. After processing, the video medium may be used to reproduce the images by displaying the images using a display device. The video medium may also be converted into other formats, e.g. from film into a digital format, for display or additional processing.

A video capture device often captures images with separate color channels, (e.g., red, blue, and green channels). For example, a TechniColor camera captures images using a separate filmstrip for the red, green, and blue colors to generate red, green, and blue frames for each image. Similarly, a color photosensor array found in a digital camera generally includes separate pixels for capturing the red, green, and blue colors of an image.

Unfortunately, many video capture devices do not capture the separate color channels with the same image quality. One or more of the color channels in the video medium may have chromatic aberrations with respect to the one or more of the other color channels. These chromatic aberrations, such as blur, may occur as a result of the properties of either the video capture medium or the video capture device. For example, the red filmstrip in a TechniColor film may be more blurred than the blue and green filmstrips as a result of the light captured on the red filmstrip first passing through the blue filmstrip. As another example, a lens that focuses light onto a photosensor array may have different indices of refraction for different colors. Consequently, one or more of the colors in a photosensor array may be blurred with respect to one or more of the other colors because of properties of the lens.

In addition, the aging characteristics of a video medium may be such that the video medium deteriorates over time or in response to environmental conditions. The deterioration of the video medium may result in misregistration of the color channels of the video medium. Images captured on film using a TechniColor camera provide an example. Since the red, blue, and green color channels are recorded on separate black and white filmstrips with no precision mechanism to align them, there is generally misregistration between the color channels. The misalignment may vary from frame to frame and from shot to shot. This gives a blurred image when the film is projected. Moreover, the filmstrips for each color are developed separately, the chemical process for each filmstrip may result in misregistration of the color channels. In addition, the filmstrips for each color may deteriorate differently or at different rates over time due to such factors as heat and humidity. The deteriorations may lead to warping or shrinking of the filmstrips. As a result, the registration of the displayed images may change over time resulting a color misalignment.

It would be desirable to be able to improve the registration in a digital video.

SUMMARY

One aspect of the present invention provides a method performed by a processing system. The method includes building a first image pyramid of a first frame of a first channel of a digital video, building a second image pyramid of a second frame of a second channel of the digital video, the second frame corresponding to the first frame, and determining a first global motion estimation for the first frame to the second frame based on the first image pyramid and the second image pyramid.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As described herein, a system and method for registering color channels in a digital video is provided. Embodiments of the system and method include building an image pyramid for each frame of each color channel of a digital video. In one embodiment, the image pyramids for each color channel are used to determine a global motion estimation and a local deformation motion estimation for each frame of a first color channel to each corresponding frame of a second color channel. Based on the global motion estimation and the local deformation motion estimation for each frame, the first color channel is resampled to register the first color channel to the second color channel.

In one embodiment, for a TechniColor film, the image pyramids for each color channel are used to determine a global motion estimation and a local deformation motion estimation for each frame of the red and blue color channels to each corresponding frame of the green color channel. Based on the global motion estimation and the local deformation motion estimation for each frame, the red and blue color channels are resampled to register the red and blue color channels to the green color channel.

Figure 1:
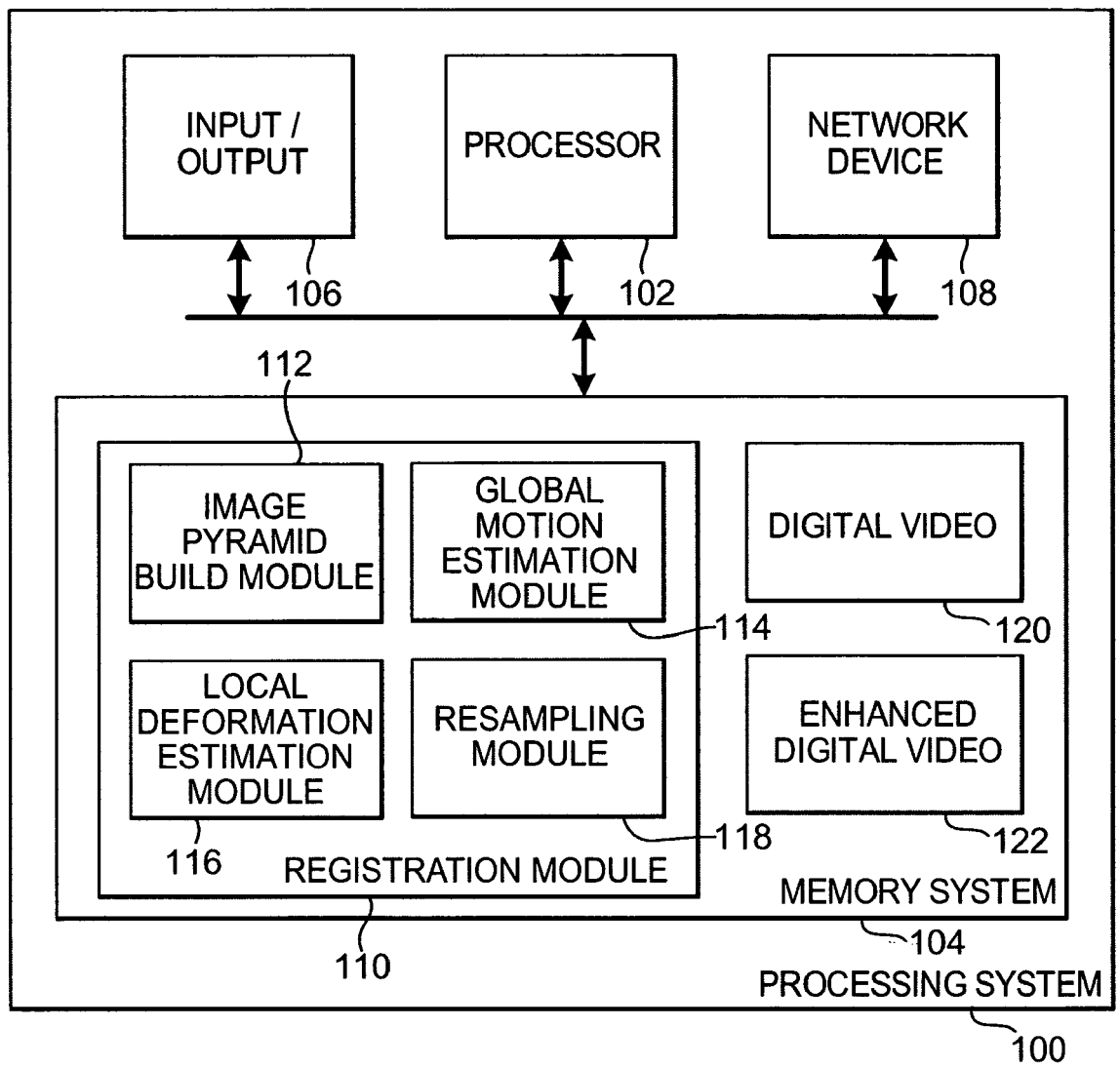
FIG. 1 is a block diagram illustrating one embodiment of a processing system configured to register color channels in a digital video.

FIG. 1 is a block diagram illustrating one embodiment of a processing system 100 configured to register the color channels in a digital video 120. Processing system 100 comprises a processor 102, a memory system 104, an input/output unit 106, and a network device 108. Memory system 104 stores a registration module 110, a digital video 120, and an enhanced digital video 122. Registration module 110 includes an image pyramid build module 112, a global motion estimation module 114, a local deformation estimation module 116, and a resampling module 118.

Processing system 100 is configured to generate enhanced digital video 122 from digital video 120 using information generated by registration module 110, image pyramid build module 112, global motion estimation module 114, local deformation estimation module 116, and resampling module 118. Processing system 100 comprises any type of computer system or portable or non-portable electronic device. Example computer systems include desktop, laptop, notebook, workstation, or server computer systems, and examples of electronic devices include digital cameras, digital video cameras, printers, scanners, mobile telephones, and personal digital assistants.

In one embodiment, registration module 110, image pyramid build module 112, global motion estimation module 114, local deformation estimation module 116, and resampling module 118 each comprise instructions stored in memory system 104 that are accessible and executable by processor 102. In one embodiment, image pyramid build module 112, global motion estimation module 114, local deformation estimation module 116, and resampling module 118 are programmed in C++. Memory system 104 comprises any number and types of volatile and non-volatile storage devices such as RAM, hard disk drives, CD-ROM drives, and DVD drives. In other embodiments, registration module 110, image pyramid build module 112, global motion estimation module 114, local deformation estimation module 116, and resampling module 118 may comprise any combination of hardware, firmware, and software components configured to perform the functions described herein.

In one embodiment, a user of processing system 100 manages and controls the operation of registration module 110, image pyramid build module 112, global motion estimation module 114, local deformation estimation module 116, and resampling module 118 by providing inputs and receiving outputs using input/output unit 106. In another embodiment, processing system 100 automatically manages and controls the operation of registration module 110, image pyramid build module 112, global motion estimation module 114, local deformation estimation module 116, and resampling module 118 without user intervention. Input/output unit 106 may comprise any combination of a keyboard, a mouse, a display device, or other input/output device that is coupled, directly or indirectly, to processing system 100.

Registration module 110, image pyramid build module 112, global motion estimation module 114, local deformation estimation module 116, resampling module 118, and digital video 120 may each be stored on a medium separate from processing system 100 prior to being stored in processing system 100. Examples of such a medium include a hard disk drive, a compact disc (e.g., a CD-ROM, CD-R, or CD-RW), and a digital video disc (e.g., a DVD, DVD-R, or DVD-RW). Processing system 100 may access registration module 110, image pyramid build module 112, global motion estimation module 114, local deformation estimation module 116, resampling module 118, and digital video 120 from a remote processing or storage system (not shown) that comprises the medium using network device 108. Network device 108 may be coupled, directly or indirectly, to any type of wired or wireless local area, wide area, or global communications network.

Digital video 120 comprises a plurality of digital frames. Each frame may be displayed separately to form an image or in succession, e.g., 24 or 30 frames per second, to form a video (i.e., a set of images that may appear to be moving). Digital video 120 may comprise one or more scenes where a scene comprises a set of related frames. In one embodiment, digital video 120 comprises an RGB color space where each frame has a red frame with red pixel values, a blue frame with blue pixel values, and a green frame with green pixel values. The red, green, and blue pixel values are combined during the display of digital video 120 to reproduce the images of digital video 120. In other embodiments, each frame may comprise other sets of color frames or may combine the pixel values for each color.

Digital video 120 may be generated either from a video or other set of images from another medium, (e.g., film, or from a camera or other image capture device directly). For example, a TechniColor film captured using a TechniColor camera may be converted into digital video 120 using a scanning process. In other embodiments, digital video 120 may comprise a single digital image frame or an unrelated set of image frames.

Figure 2:
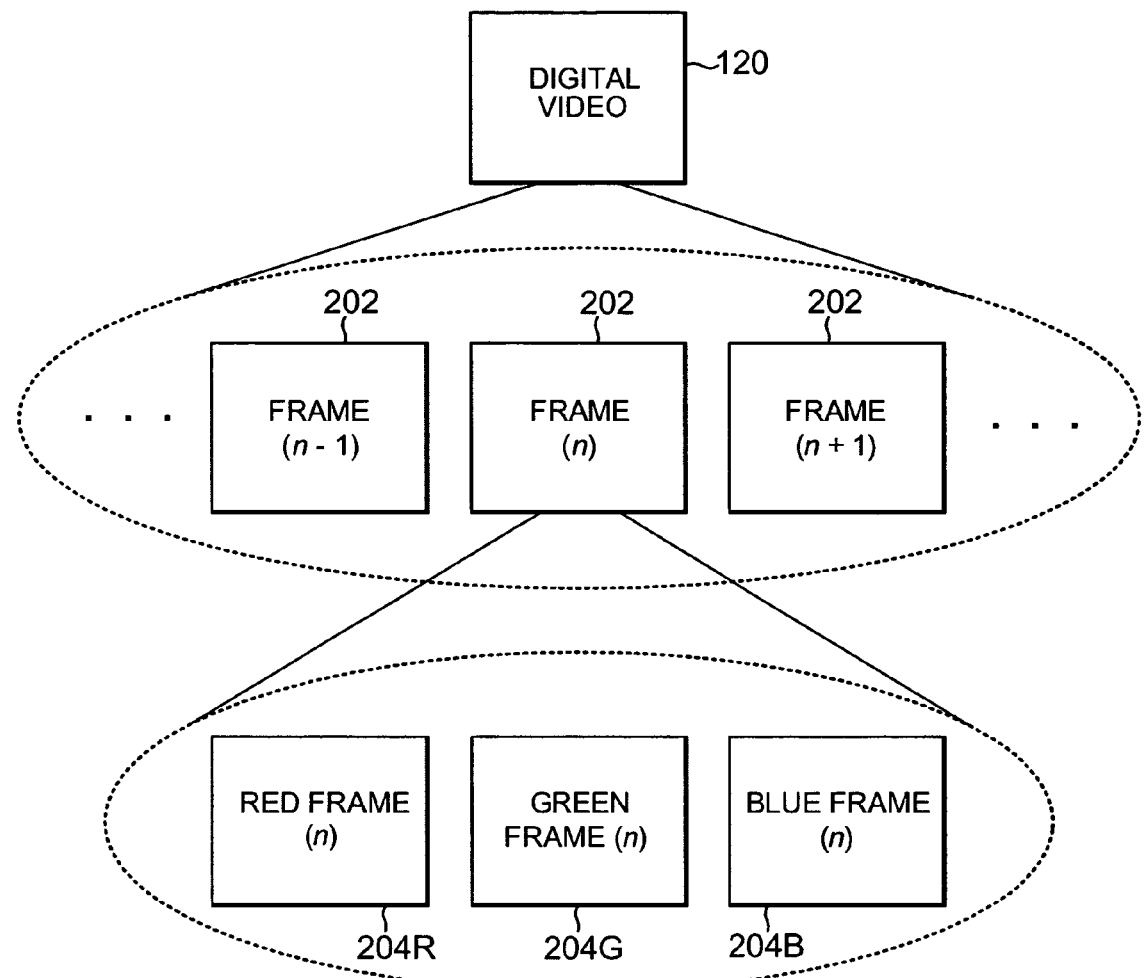
FIG. 2 is a block diagram illustrating one embodiment of a digital video.

FIG. 2 is a block diagram illustrating one embodiment of a digital video 120. Digital video 120 comprises a sequential series of frames 202 where each frame has a red frame 204R, a green frame 204G, and a blue frame 204B, i.e., color frames 204. In one embodiment, digital video 120 is generated from a TechniColor film or other types of film or media. In other embodiments, digital video 120 is captured directly from an image capture device such as a digital camera. The set of color frames 204 comprise red, green, and blue color channels where the red color channel comprises each of the red frames 204R in digital video 120, the green color channel comprises each of the green frames 204G in digital video 120, and the blue color channel comprises each of the blue frames 204B in digital video 120. In other embodiments, digital video 120 comprises a single image frame 202 where the frame has a red frame 204R, a green frame 204G, and a blue frame 204B. In one embodiment, digital video 120 includes an RGB misaligned composite video including the red, green, and blue color channels. In another embodiment, digital video 120 includes three mono channel videos, where each mono channel includes one of the red, green, and blue color channels.

Figure 3:
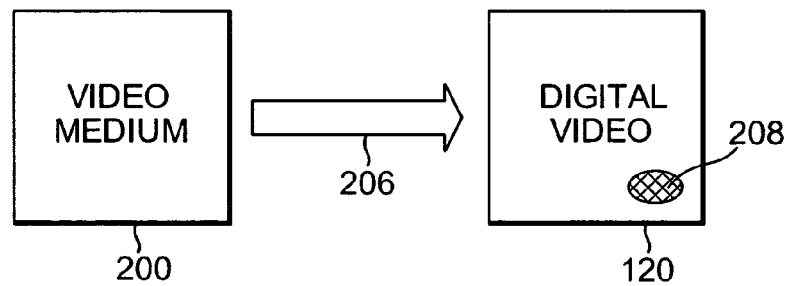
FIG. 3 is a block diagram illustrating one embodiment of a process of generating a digital video from a video medium.

FIG. 3 is a block diagram illustrating a process of generating digital video 120 from video medium 200 as indicated by arrow 206. In the process of converting video medium 200 to digital video 120, color misalignment may be produced in one or more of the frames of digital video 120 as indicated by artifact 208 due to misregistration of the red, blue, and green color channels.

Referring back to FIG. 1, in one embodiment processing system 100 executes registration module 110, image pyramid build module 112, global motion estimation module 114, local deformation estimation module 116, and resampling module 118 to register the red and blue color channels to the green color channel to generate enhanced digital video 122 from digital video 120. In doing so, registration module 110, image pyramid build module 112, global motion estimation module 114, local deformation estimation module 116, and resampling module 118 attempt to remove color misalignment artifact 208 and any other color misalignment artifacts from digital video 120 to generate enhanced digital video 122.

Figure 4:
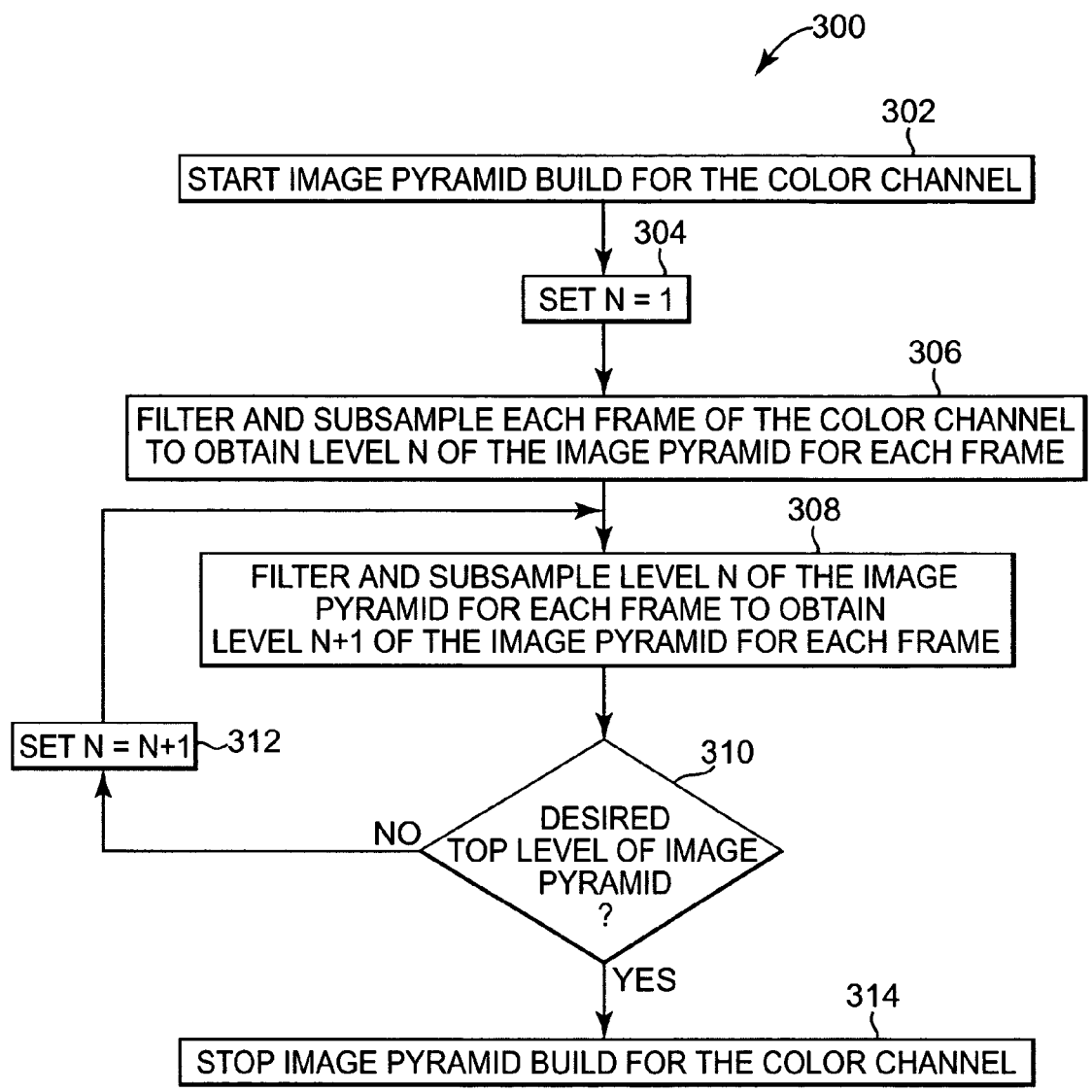
FIG. 4 is a flow diagram illustrating one embodiment of a method for building an image pyramid.

FIG. 4 is a flow diagram illustrating one embodiment of a method 300 for building an image pyramid. Processing system 100 executes image pyramid build module 112 to perform method 300 for each color channel of digital video 120.

In one embodiment, processing system 100 executes image pyramid build module 112 to perform method 300 to build Laplacian pyramids, Gaussian pyramids, or other suitable image pyramids for each frame of each color channel of digital video 120.

At 302, the image pyramid build for a selected color channel, such as a red color channel, a blue color channel, or a green color channel of digital video 120 is started. At 304, a variable "N" indicating the current level of the image pyramid is set equal to one. At 306, each frame of the selected color channel is filtered and subsampled to obtain level N of the image pyramid for each frame. In one embodiment, the resolution of each frame is reduced by 75% by the subsampling. In one embodiment, a Laplacian filter or other suitable filter is applied during the subsampling of each frame. A Laplacian filter is an edge enhancement filter that is particularly good at finding the fine details in an image. A Laplacian filter can restore the fine detail to an image that has been smoothed or blurred. At 308, level N of the image pyramid for each frame is filtered and subsampled to obtain level N+1 of the image pyramid for each frame. In one embodiment, the resolution of each frame is again reduced by 75% by the subsampling. Although blocks 306 and 308 include filtering and subsampling each frame, in other embodiments other suitable methods for reducing the resolution of each frame at each level of the image pyramid are used which retain sufficient image information.

At 310, processing system 100 executes registration module 110 to determine whether the top level (coarsest level) of the image pyramid for each frame has been determined. In one embodiment, the number of levels for the image pyramid for each frame is based on the size of the original image for each frame and the potential range of motion for each frame. As the potential motion for each frame increases, the number of levels of the image pyramid for each frame increases. In one embodiment, the image pyramid for each frame includes four levels including the original frame (finest level) and the top level (coarsest level). If the top level of the image pyramid for each frame has been determined, then at 314 the image pyramid build for each frame for the selected color channel is stopped. If the top level of the image pyramid for each frame has not been determined, then at 312, N is set equal to N+1 to increment the level of the image pyramid for each frame. Control then returns to block 308 where the next level of the image pyramid for each frame is determined by filtering and subsampling the previous level of the image pyramid for each frame.

Figure 5:
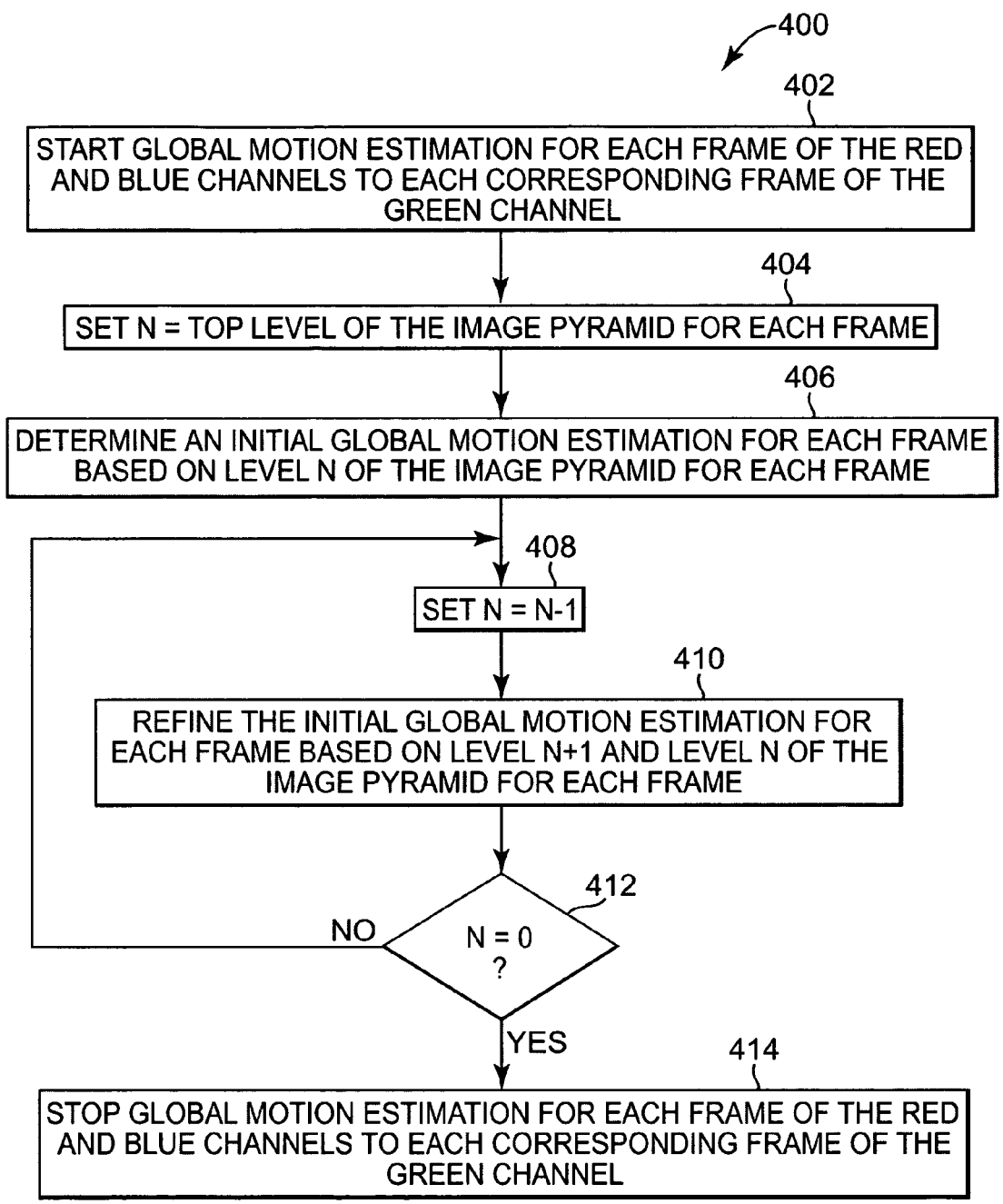
FIG. 5 is a flow diagram illustrating one embodiment of a method for determining a global motion estimation.

FIG. 5 is a flow diagram illustrating one embodiment of a method 400 for determining a global motion estimation for each frame of the red and blue channels of digital video 120 to each corresponding frame of the green channel of digital video 120. Although the illustrated embodiment of method 400 determines global motion estimation for each frame of the red and blue channels to each corresponding frame of the green channel, other embodiments determine global motion estimation for each frame of any first color channel to each corresponding frame of any second color channel. In one embodiment, a global affine motion estimation, global translational motion estimation, global projective motion estimation, or other suitable global motion estimation for each frame of the red and blue channels to each corresponding frame of the green channel is determined. The global motion estimation for each frame is based on the image pyramids for each frame of the red, blue, and green channels. Processing system 100 executes global motion estimation module 114 to perform method 400.

At 402, the global motion estimation for each frame of the red and blue channels to each corresponding frame of the green channel is started. At 404, the variable "N" is set equal to the top level (coarsest level) of the image pyramid for each frame. At 406, an initial global motion estimation for each frame based on level N of the image pyramid for each frame is determined. The initial global motion estimation of each frame of the red channel to each corresponding frame of the green channel is determined, and the initial global motion estimation of each frame of the blue channel to each corresponding frame of the green channel is determined. At 408, the level N of the image pyramid for each frame is set equal to N−1 (the next finer level). At 410, the initial global motion estimation for each frame is refined or improved based on level N+1 data of the image pyramid and the current level N of the image pyramid for each frame.

At 412, processing system 100 executes registration module 110 to determine whether level N=0 (the finest level) of the image pyramid for each frame. If the finest level of the image pyramid for each frame is the current level of the image pyramid for each frame, then at 414, the global motion estimation for each frame of the red and blue channel to each corresponding frame of the green channel is completed. If the finest level of the image pyramid for each frame is not the current level of the image pyramid for each frame, then control returns to block 408 where level N is set equal to level N−1 of the image pyramid for each frame and the processes continues.

In one embodiment, Technicolor films include significant film grain having a size of about four pixels in digital video 120. Therefore, if the data is analyzed to determine a global motion estimation at the original resolution, noise due to the film grain may result in inaccurate results. To obtain accurate results for the global motion estimation, the global motion estimation is determined down to the second to the bottom level of the image pyramid and the results are extrapolated to the original resolution.

Figure 6:
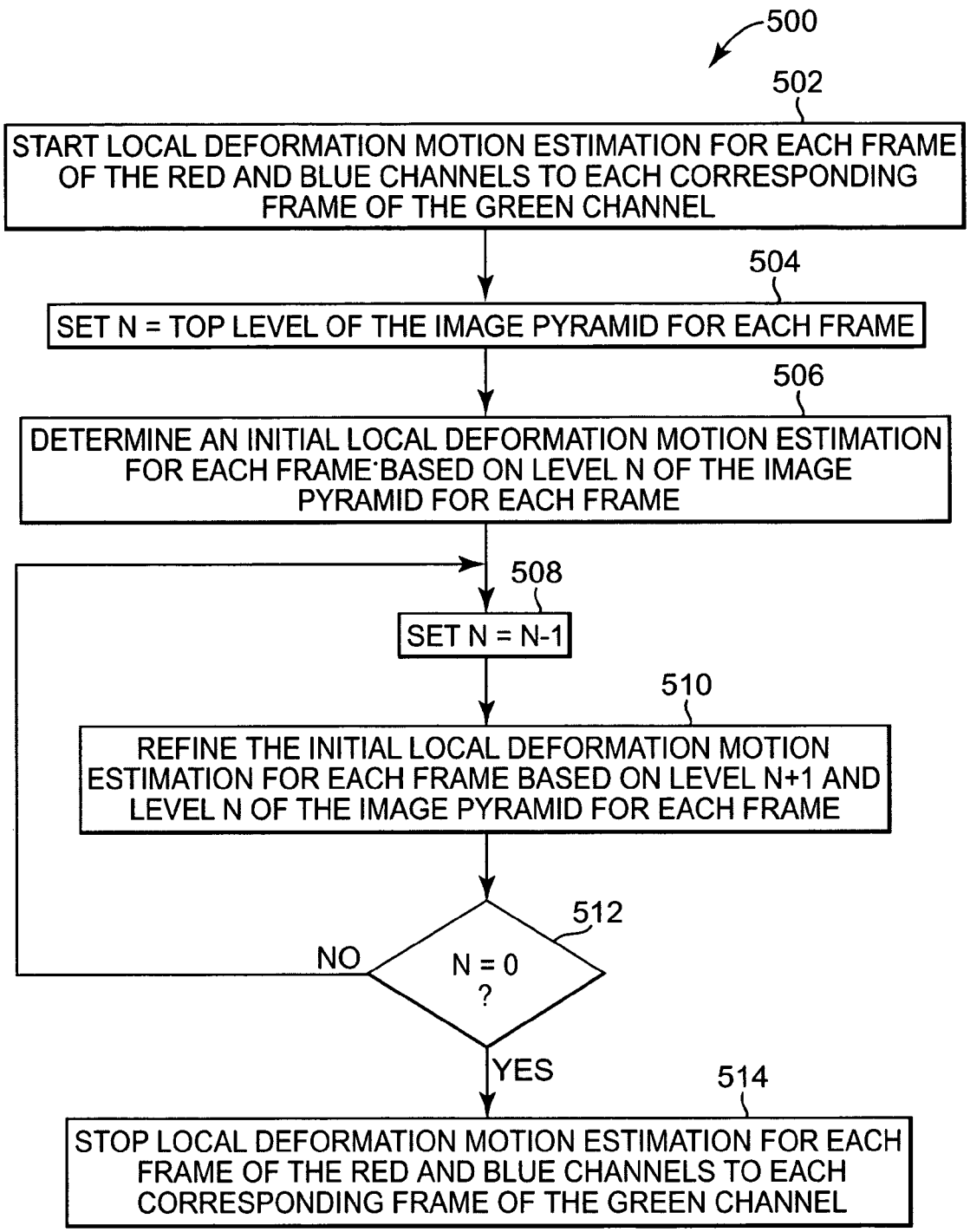
FIG. 6 is a flow diagram illustrating one embodiment of a method for determining a local deformation motion estimation.

FIG. 6 is a flow diagram illustrating one embodiment of a method 500 for determining a local deformation motion estimation for each frame of the red and blue channels of digital video 120 to each corresponding frame of the green channel of digital video 120. In one embodiment, a local deformation motion estimation based on B-splines or other suitable technique is used to determine a local deformation motion estimation for each frame of the red and blue channels to each corresponding frame of the green channel. The local deformation motion estimation for each frame is based on the image pyramids for each frame of the red, blue, and green channels. Processing system 100 executes local deformation motion estimation module 116 to perform method 500.

At 502, the local deformation motion estimation for each frame of the red and blue channels to each corresponding frame of the green channel is started. At 504, the variable "N" is set equal to the top level (coarsest level) of the image pyramid for each frame. At 506, an initial local deformation motion estimation for each frame based on level N of the image pyramid for each frame is determined. In one embodiment, the initial local deformation motion estimation is initialized using the global motion estimation previously determined. The initial local deformation motion estimation of each frame of the red channel to each corresponding frame of the green channel is determined, and the initial local deformation motion estimation of each frame of the blue channel to each corresponding frame of the green channel is determined. At 508, the level N of the image pyramid for each frame is set equal to N−1 (the next finer level). At 510, the initial local deformation motion estimation for each frame is refined or improved based on level N+1 data of the image pyramid and the current level N of the image pyramid for each frame.

At 512, processing system 100 executes registration module 110 to determine whether level N=0 (the finest level) of the image pyramid for each frame. If the finest level of the image pyramid for each frame is the current level of the image pyramid for each frame, then at 514 the local deformation motion estimation for each frame of the red and blue channel to each corresponding frame of the green channel is completed. If the finest level of the image pyramid for each frame is not the current level of the image pyramid for each frame, then control returns to block 508 where level N is set equal to level N−1 of the image pyramid for each frame and the processes continues.

In one embodiment as previously mentioned, Technicolor films include significant film grain having a size of about four pixels in digital video 120. Therefore, if the data is analyzed to determine a local deformation motion estimation at the original resolution, noise due to the film grain may result in inaccurate results. To obtain accurate results for the local deformation motion estimation, the local deformation motion estimation is determined down to the second to the bottom level of the image pyramid and the results are extrapolated to the original resolution.

Figure 7:
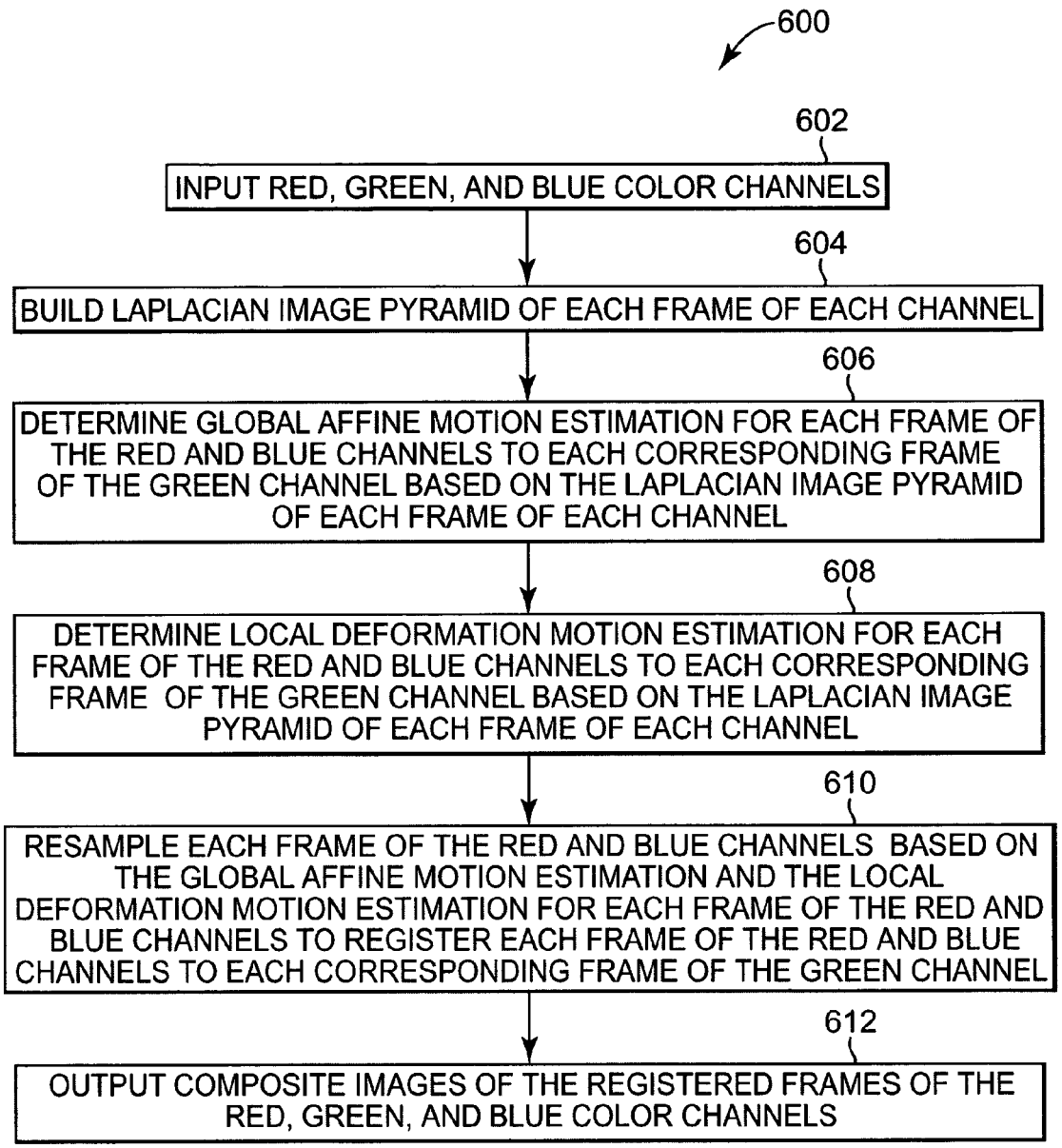
FIG. 7 is a flow diagram illustrating one embodiment of a method for registering the red and blue color channels to the green color channel in a digital video.

FIG. 7 is a flow diagram illustrating one embodiment of a method 600 for registering the red and blue channels to the green channel of digital video 120 to provide enhanced digital video 122. Processing system 100 executes registration module 110, image pyramid build module 112, global motion estimation module 114, local deformation estimation module 116, and resampling module 118 to perform method 600.

At 602, processing system 100 executes registration module 110 to input the red, green, and blue color channels of digital video 120. At 604, processing system 100 executes image pyramid build module 112 to build Laplacian image pyramids of each frame of each color channel. In one embodiment, another suitable filter is used in place of the Laplacian filter for building the image pyramids. At 606, processing system 100 executes global motion estimation module 114 to determine a global affine motion estimation for each frame of the red and blue channels to each corresponding frame of the green channel based on the Laplacian image pyramid for each frame as previously described with respect to FIG. 5. In one embodiment, another suitable type of global motion estimation is determined in place of the global affine motion estimation. At 608, in one embodiment, processing system 100 executes local deformation estimation module 116 to determine a local deformation motion estimation for each frame of the red and blue channels to each corresponding frame of the green channel based on the Laplacian image pyramid for each frame as previously described with respect to FIG. 6.

At 610, processing system 100 executes resampling module 118 to resample each frame of the red and blue channels based on the global affine motion estimation and the local deformation motion estimation for each frame of the red and blue channels to register each frame of the red and blue channels to each corresponding frame of the green channel. The global motion estimation for each frame of the red and blue channels to each corresponding frame of the green channel describes the overall image position of each frame of the red and blue channels to each corresponding frame of the green channel. The local deformation motion estimation for each frame of the red and blue channels to each corresponding frame of the green channel describes the position of image portions within each frame of the red and blue channels to the corresponding image portions within each frame of the green channel. In other embodiments, one of the global motion estimation or the local deformation motion estimation for each frame is used by itself for registering each frame of the red and blue channels to each corresponding frame of the green channel.

At 612, processing system 100 executes registration module 110 to output composite color images of the registered frames of the red, blue, and green color channels.

By building Laplacian pyramids for each frame for each color channel and by determining the global motion estimations and local deformation estimations based on the Laplacian pyramids, the efficiency and robustness of the registration process can be improved. In addition, the registration process removes color misalignment artifacts from digital video 120 to provide enhanced digital video 122.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a processing system, the method comprising:
    building, via a processing system, a first image pyramid of a first frame of a first channel of a digital video;
    building, via the processing system, a second image pyramid of a second frame of a second channel of the digital video, the second frame corresponding to the same instant as the first frame;
    determining, via the processing system, a first global motion estimation for the first frame to the second frame based on the first image pyramid and the second image pyramid; and
    determining, via the processing system, a local deformation motion estimation for the first frame to the second frame based on the first image pyramid, the second image pyramid, and the first global motion estimation, wherein determining the local deformation motion estimation includes initializing the local deformation motion estimation using the first global motion estimation;
    wherein determining the first global motion estimation for the first frame to the second frame comprises:
    determining an initial global motion estimation for the first frame to the second frame based on a top level of the first image pyramid and the second image pyramid;
    refining the initial global motion estimation for the first frame to the second frame based on each subsequent lower level of the first image pyramid and the second image pyramid down to the second to the bottom level of the first image pyramid and the second image pyramid to provide an intermediate global motion estimation; and
    extrapolating the intermediate global motion estimation to an original resolution of the first frame and the second flame, without refining the intermediate global motion estimation to the original resolution based on the first image pyramid and the second image pyramid, to provide the first global motion estimation such that noise of the first frame and the second frame does not result in an inaccurate first global motion estimation.

2. The method of claim 1, further comprising:
    resampling, via the processing system, the first frame based on the first global motion estimation to register the first frame to the second frame.

3. The method of claim 2, wherein building the first image pyramid comprises building the first image pyramid of a first frame of a red channel of the digital video, and wherein building the second image pyramid comprises building the second image pyramid of a second frame of a green channel of the digital video.

4. The method of claim 2, wherein building the first image pyramid comprises building the first image pyramid of a first frame of a blue channel of the digital video, and wherein building the second image pyramid comprises building the second image pyramid of a second frame of a green channel of the digital video.

5. The method of claim 2, further comprising:
outputting, via the processing system, a composite color image of a registered first frame and second frame.

6. The method of claim 1, wherein determining the local deformation motion estimation for the first frame to the second frame comprises:
determining an initial local deformation motion estimation for the first frame to the second frame based on a top level of the first image pyramid and the second image pyramid; and
refining the initial local deformation motion estimation for the first frame to the second frame based on each subsequent lower level of the first image pyramid and the second image pyramid to determine the local deformation motion estimation.

7. The method of claim 1, further comprising:
resampling, via the processing system, the first frame based on the local deformation motion estimation to register the first frame to the second frame.

8. The method of claim 1, wherein determining the local deformation motion estimation comprises determining the local deformation motion estimation using B-splines.

9. The method of claim 1, wherein building the first image pyramid comprises building a first Laplacian pyramid, and wherein building the second image pyramid comprises building a second Laplacian pyramid.

10. The method of claim 1, wherein determining the first global motion estimation comprises determining a first global affine motion estimation.

11. The method of claim 2, further comprising:
building, via the processing system, a third image pyramid of a third frame of a third channel of the digital video, the third frame corresponding to the first frame;
determining via the processing system a second global motion estimation for the third frame to the second frame based on the third image pyramid and the second image pyramid;
resampling via the processing system the third frame based on the second global motion estimation to register the third frame to the second frame; and
outputting via the processing system a composite color image of a registered first frame, second frame, and third frame.

12. The method of claim 1, further comprising:
scanning, via the processing system, a color film to obtain the digital video.

13. The method of claim 1, wherein the noise comprises a film grain having a size of about four pixels in the digital video.

14. A system comprising:
a processor; and
a memory system for storing a digital video and a registration module;
wherein the processor is configured to execute the registration module to:
build a first image pyramid of a first frame of a first channel of the digital video;
build a second image pyramid of a second frame of a second channel of the digital video, the second frame corresponding to the same instant as the first frame;
determine a global motion estimation for the first frame to the second frame based on the first image pyramid and the second image pyramid; and
determine a local deformation motion estimation for the first frame to the second frame based on the first image pyramid, the second image pyramid, and the global motion estimation, wherein determining the local deformation motion estimation includes initializing the local deformation motion estimation using the global motion estimation; and
wherein the processor is configured to execute the registration module to determine the global motion estimation by:
determining an initial global motion estimation for the first frame to the second frame based on a top level of the first image pyramid and the second image pyramid;
refining the initial global motion estimation for the first frame to the second frame based on each subsequent lower level of the first image pyramid and the second image pyramid down to the second to the bottom level of the first image pyramid and the second image pyramid to provide an intermediate global motion estimation; and
extrapolating the intermediate global motion estimation to an original resolution of the first frame and the second frame, without refining the intermediate global motion estimation to the original resolution based on the first image pyramid and the second image pyramid, to provide the first global motion estimation such that noise of the first frame and the second frame does not result in an inaccurate first global motion estimation.

15. The system of claim 14, wherein the processor is configured to execute the registration module to:
resample the first frame based on the global motion estimation to register the first frame to the second frame.

16. The system of claim 15, wherein the processor is configured to execute the registration module to:
build the first image pyramid of a first frame of a red channel of the digital video; and
build the second image pyramid of a second frame of a green channel of the digital video.

17. The system of claim 15, wherein the processor is configured to execute the registration module to:
build the first image pyramid of a first frame of a blue channel of the digital video; and
build the second image pyramid of a second frame of a green channel of the digital video.

18. The system of claim 15, wherein the processor is configured to execute the registration module to:
output a composite color image comprising a registered first frame and second frame.

19. The system of claim 14, wherein the processor is configured to execute the registration module to:
determine the local deformation motion estimation using B-splines.

20. The system of claim 14, wherein the processor is configured to execute the registration module to:
resample the first frame based on the local deformation motion estimation to register the first frame to the second frame.

21. The system of claim 14, wherein the processor is configured to execute the registration module to:
build a first Laplacian image pyramid of the first frame; and
build a second Laplacian image pyramid of the second frame.

22. The system of claim 14, wherein the noise comprises a film grain having a size of about four pixels in the digital video.

23. A system comprising:
a memory system storing a registration module; and
a processor configured to execute the registration module;
wherein the registration module comprises:
means for building a first image pyramid of a first frame of a first channel of a digital video;
means for building a second image pyramid of a second frame of a second channel of the digital video, the second frame corresponding to the same instant as the first frame;
means for determining a global motion estimation for the first frame to the second frame based on the first image pyramid and the second image pyramid; and
means for determining a local deformation motion estimation for the first frame to the second frame based on the first image pyramid, the second image pyramid, and the global motion estimation, wherein the means for determining the local deformation motion estimation includes initializing the local deformation motion estimation using the global motion estimation; and
wherein the means for determining the global motion estimation comprises:
determining, an initial global motion estimation for the first frame to the second frame based on a top level of the first image pyramid and the second image pyramid;
refining the initial global motion estimation for the first frame to the second frame based on each subsequent lower level of the first image pyramid and the second image pyramid down to the second to the bottom level of the first image pyramid and the second image pyramid to provide an intermediate global motion estimation; and
extrapolating the intermediate global motion estimation to an original resolution of the first frame and the second frame, without refining the intermediate global motion estimation to the original resolution based on the first image pyramid and the second image pyramid, to provide the first global motion estimation such that noise of the first frame and the second frame does not result in an inaccurate first global motion estimation.

24. The system of claim 23, wherein the registration module further comprises:
means for resampling the first frame based on the global motion estimation to register the first frame to the second frame.

25. The system of claim 23, wherein the registration module further comprises:
means for resampling the first frame based on the local deformation motion estimation to register the first frame to the second frame.

26. The system of claim 23, wherein the noise comprises a film grain having a size of about four pixels in the digital video.

27. A computer-readable storage medium including instructions executable by a processing system for performing a method comprising:
building a first image pyramid of a first frame of a first channel of a digital video;
building a second image pyramid of a second frame of a second channel of the digital video, the second frame corresponding to the same instant as the first frame;
determining a global motion estimation for the first frame to the second frame based on the first image pyramid and the second image pyramid; and
determining a local deformation motion estimation for the first frame to the second frame based on the first image pyramid, the second image pyramid, and the global motion estimation, wherein determining the local deformation motion estimation includes initializing the local deformation motion estimation using the global motion estimation:
wherein the instructions executable by the processing system for performing the method comprising determining the local deformation motion estimation for the first frame to the second frame comprises:
determining an initial local deformation motion estimation for the first frame to the second frame based on a top level of the first image pyramid and the second image pyramid;
refining the initial local deformation motion estimation for the first frame to the second frame based on each subsequent lower level of the first image pyramid and the second image pyramid down to the second to the bottom level of the first image pyramid and the second image pyramid to provide an intermediate local, deformation motion estimation; and
extrapolating the intermediate local deformation motion estimation to an original resolution of the first frame and the second frame, without refining the intermediate local deformation motion estimation to the original resolution based on the first image pyramid and the second image pyramid, to provide the local deformation motion estimation such that noise of the first frame and the second frame does not result in an inaccurate local deformation motion estimation.

28. The computer-readable storage medium of claim 27, including instructions executable by the processing system for performing the method comprising:
resampling the first frame based on the global motion estimation to register the first frame to the second frame.

29. The computer-readable storage medium of claim 28, including instructions executable by the processing system for performing the method comprising:
outputting a composite color image comprising a registered first frame and second frame.

30. The computer-readable storage medium of claim 28, including instructions executable by the processing system for performing the method comprising:
building the first image pyramid of a first frame of a red channel of the digital video; and
building the second image pyramid of a second frame of a green channel of the digital video.

31. The computer-readable storage medium of claim 28, including instructions executable by the processing system for performing the method comprising:
building the first image pyramid of a first frame of a blue channel of the digital video; and
building the second image pyramid of a second frame of a green channel of the digital video.

32. The computer-readable storage medium of claim 27, including instructions executable by the processing system for performing the method comprising:

resampling the first frame based on the local deformation motion estimation to register the first frame to the second frame.

33. The computer-readable storage medium of claim 27, including instructions executable by the processing system for performing the method comprising:
building a first Laplacian pyramid of the first frame; and
building a second Laplacian pyramid of the second frame.

34. The computer-readable storage medium of claim 27, wherein the noise comprises a film grain having a size of about four pixels in the digital video.

35. A system for processing a digital video, the system comprising:
a memory system storing a registration module; and
a processor configured to execute the registration module; wherein the registration module comprises:
an image pyramid build module configured to build a first image pyramid of a first frame of a first channel of a digital video, and build a second image pyramid of a second frame of a second channel of the digital video, the second frame corresponding to the same instant as the first frame;
a global motion estimation module configured to determine a global motion estimation for the first frame to the second frame based on the first image pyramid and the second image pyramid; and
a local deformation estimation module configured to determine a local deformation motion estimation for the first frame to the second frame based on the first image pyramid, the second image pyramid, and the global motion estimation, wherein the local deformation estimation module is configured to initialize the local deformation motion estimation using the global motion estimation; and wherein the local deformation estimation module is configured to determine the local deformation motion estimation by:
determining an initial local deformation motion estimation for the first frame to the second frame based on a top level of the first image pyramid and the second image pyramid;
refining the initial local deformation motion estimation for the first frame to the second frame based on each subsequent lower level of the first image pyramid the second image pyramid down to the second to the bottom level of the first image pyramid and the second image pyramid to provide an intermediate local deformation motion estimation; and
extrapolating the intermediate local deformation motion estimation to an original resolution of the first frame and the second frame, without refining the intermediate local deformation motion estimation to the original resolution based on the first image pyramid and the second image pyramid to provide the local deformation motion estimation such that noise of the first frame and the second frame does not result in an inaccurate local deformation motion estimation.

36. The system of claim 35, wherein the registration module further comprises:
a resampling module configured to resample the first frame based on the local deformation motion estimation to register the first frame to the second frame.

37. The system of claim 35, wherein the noise comprises a film grain having a size of about four pixels in the digital video.

* * * * *

UNITED STATES PATENT AND TRADEMARK OFFICE
CERTIFICATE OF CORRECTION

| | | |
|---|---|---|
| PATENT NO. | : 7,924,922 B2 | Page 1 of 1 |
| APPLICATION NO. | : 11/074978 | |
| DATED | : April 12, 2011 | |
| INVENTOR(S) | : Mei Chen | |

It is certified that error appears in the above-identified patent and that said Letters Patent is hereby corrected as shown below:

In column 8, line 58, in Claim 1, delete "flame," and insert -- frame, --, therefor.

In column 11, line 32, in Claim 23, delete "determining," and insert -- determining --, therefor.

In column 12, line 30, in Claim 27, delete "local," and insert -- local --, therefor.

In column 14, line 20, in Claim 35, delete "pyramid to" and insert -- pyramid, to --, therefor.

Signed and Sealed this
Eleventh Day of September, 2012

David J. Kappos
*Director of the United States Patent and Trademark Office*